United States Patent
Kubota

(10) Patent No.: US 9,664,246 B2
(45) Date of Patent: May 30, 2017

(54) LIQUID SEALED MOUNT

(71) Applicant: YAMASHITA RUBBER KABUSHIKI KAISHA, Fujimino-shi, Saitama (JP)

(72) Inventor: Yousuke Kubota, Fujimino (JP)

(73) Assignee: YAMASHITA RUBBER KABUSHIKI KAISHA, Fujimino-Shi (JP)

( * ) Notice: Subject to any disclaimer, the term of this patent is extended or adjusted under 35 U.S.C. 154(b) by 0 days.

(21) Appl. No.: 14/900,889

(22) PCT Filed: Aug. 13, 2014

(86) PCT No.: PCT/JP2014/071415
§ 371 (c)(1),
(2) Date: Dec. 22, 2015

(87) PCT Pub. No.: WO2015/022985
PCT Pub. Date: Feb. 19, 2015

(65) Prior Publication Data
US 2016/0153514 A1 Jun. 2, 2016

(30) Foreign Application Priority Data
Aug. 14, 2013 (JP) .................................. 2013-168740

(51) Int. Cl.
*F16F 9/10* (2006.01)
*F16F 13/10* (2006.01)
(Continued)

(52) U.S. Cl.
CPC ............... *F16F 9/10* (2013.01); *F16F 9/361* (2013.01); *F16F 9/437* (2013.01); *F16F 13/103* (2013.01)

(58) Field of Classification Search
CPC .......... F16F 13/103; F16F 9/437; F16F 9/361; F16F 9/10
(Continued)

(56) References Cited

U.S. PATENT DOCUMENTS

| 4,932,636 | A | * | 6/1990 | Phillips | ................... | F16F 13/22 267/140.13 |
| 5,775,666 | A | * | 7/1998 | Tsukamoto | ............. | F16F 13/10 267/140.13 |

(Continued)

FOREIGN PATENT DOCUMENTS

| JP | 9-158975 | 6/1997 |
| JP | 2002-89613 | 3/2002 |

(Continued)

OTHER PUBLICATIONS

International Search Report, Date of mailing: Sep. 16, 2014 (Sep. 16, 2014).

*Primary Examiner* — Thomas J Williams
*Assistant Examiner* — Mariano Sy
(74) *Attorney, Agent, or Firm* — Rankin, Hill & Clark LLP

(57) ABSTRACT

An elastic main body member, a partition member, a diaphragm and a fixing ring are piled up in an outer cylinder of long cylindrical shape that surrounds the whole outside of the elastic main body member, and combined together by fixing the fixing ring by claws of the outer cylinder. An elastic main body member drain recess, a partition member first drain recess and a fixing ring drain recess are formed in each of outer circumferential portions of the elastic main body member, the partition member and the fixing ring and, when assembling, aligned continuously with each other, so that a water drain passage is formed inside the outer cylinder.

4 Claims, 8 Drawing Sheets

(51) Int. Cl.
*F16F 9/36* (2006.01)
*F16F 9/43* (2006.01)

(58) Field of Classification Search
USPC .............................. 267/122, 140.13, 140.11
See application file for complete search history.

(56) References Cited

U.S. PATENT DOCUMENTS

| | | | |
|---|---|---|---|
| 5,947,455 A * | 9/1999 | Mikasa .................... | B60G 7/02 267/140.13 |
| 7,588,235 B2 * | 9/2009 | Happou ................ | F16F 13/262 267/140.13 |
| 2003/0001322 A1 * | 1/2003 | Goto ........................ | F16F 13/18 267/140.11 |
| 2003/0071401 A1 * | 4/2003 | Kodama ............... | F16F 13/101 267/140.13 |
| 2007/0052142 A1 * | 3/2007 | Muraoka ................ | F16F 1/376 267/140.11 |
| 2010/0187733 A1 * | 7/2010 | Oohashi ................ | F16F 13/102 267/140.13 |

FOREIGN PATENT DOCUMENTS

| | | |
|---|---|---|
| JP | 3636730 | 1/2005 |
| JP | 3732271 | 10/2005 |
| JP | 2010-270827 | 12/2010 |
| JP | 2011-252535 | 12/2011 |

\* cited by examiner

LIQUID SEALED MOUNT

TECHNICAL FIELD

The present invention relates to a liquid sealed mount for use with an engine mount or the like, and more particularly, to the liquid sealed mount having an advantageous water drain structure.

BACKGROUND ART

The liquid sealed mount includes an elastic main body member of substantially truncated cone shape which is formed as a vibration isolating main body, a first metal mounting member formed integral with a top portion of the elastic main body member, an outer cylinder of circular cylindrical shape surrounding an outer circumference of a bottom section spreading in a chevron shape, a second mounting member formed of the outer cylinder per se or a bracket which is mounted on the outer cylinder, a diaphragm provided on the inside of the outer cylinder so as to cover an opening of the elastic main body member, a liquid chamber formed between the elastic main body member and the diaphragm, a partition member for partitioning the liquid chamber into a primary liquid chamber and a secondary liquid chamber, and the orifice passage provided in this partition member so as to provide communication between the primary liquid chamber and the secondary liquid chamber. The liquid sealed mount is a vibration isolating device which absorbs a vibration inputted from the first metal mounting member, by liquid column resonance of the orifice passage. In the description with respect to this liquid sealed mount, the side of the top portion of the elastic main body member along a mount axis corresponding to a center line passing through the first metal mounting member shall be referred to as an upper side and the side of bottom section shall be referred to as a lower side.

In addition, there is the liquid sealed mount of the type which has an upwardly open stopper member of cylindrical shape surrounding a periphery of the elastic main body member containing the first metal mounting member. When such stopper member is provided, there may be cases where water such as rain or the like enters at an upper opening of the stopper member and collected between the elastic main body member and the stopper member. Therefore, in order to prevent the water from being collected there, a drain hole or channel is provided in the stopper member (as an example, see a patent reference 1).

Further, the outer cylinder section is lengthened by being formed integral with the stopper member. Within this outer cylinder section, the elastic main body member, the partition member and the diaphragm are inserted and piled up in order. Then, by caulking an end of the outer cylinder section located on the diaphragm side, these are integrally combined and assembled together. The liquid sealed mount having such piled up type assembling structure is publicly known (see a patent reference 2).

PRIOR ART REFERENCE

Patent reference 1: Japanese Patent No. 3732271.
Patent reference 2: Japanese Patent No. 3636730.

DISCLOSURE OF THE INVENTION

Problem to be Solved by the Invention

In the one (the prior art example 1) disclosed in the above patent reference 1, the stopper member is relatively short and a lower end portion of the stopper member is fixed by caulking to a flange portion formed by an upper edge of the outer cylinder which is formed in a cup shape containing the liquid chamber. A part of the lower portion of the stopper member is not caulked but swelled outwardly in the radial direction so as to form a water drain passage between the stopper member and the flange of the outer cylinder. The water is dropped and drained through this passage from the inside of the stopper member to the outside of a holding member (outer cylinder).

With this construction, since an opening for drainage is not provided in the stopper member, there is no possibility of deterioration in strength, and, in addition, there is no possibility that the passage is closed by the flange formed by the upper edge of the holding member at the time of assembling.

However, when employing the piled-up type assembling structure (the prior art example 2) as described in the patent reference 2, in which each of the component members is inserted and assembled in the long outer cylinder, the outer cylinder is made as a single member in the longitudinal direction thereof, so that it is difficult to provide such a water drain structure as disclosed in the above prior art example 1 in an intermediate position in the longitudinal direction. Namely, since, in the prior art example 1, the stopper member and the outer cylinder are divided into separate members, the water drain structure is able to be formed by utilizing a connecting portion between these members. However, such connecting portion does not exist in the case where the outer cylinder is formed as a single member serving also as the stopper member. Moreover, if the swelled portion as disclosed in the prior art example 1 is formed in the outer cylinder, an intermediate portion in the longitudinal direction of the outer cylinder has to be swelled partially from the inside outwardly in the radial direction. The forming and processing in this kind are difficult, and further, in the case where the water drain passage is formed by utilizing this swelled portion, a distal end of the swelled portion has to be opened, dissimilar from the above prior art example 1. Therefore, the water drain structure of the prior art example 1 is not able to be employed in the prior art example 2.

Alternatively, it is conceivable that the opening for drainage is formed previously in the intermediate position in the longitudinal direction of the long outer cylinder. However, in this case, the opening has to be formed as small as possible in order for preventing the deterioration in the strength of the outer cylinder, as a result that high precision processing is required for preventing the opening from being closed by the elastic main body member, and so the assemblability is deteriorated.

Therefor, the present invention has an objective of realizing the water train structure which is capable of solving such problems as described above.

Means for Solving the Problem

In order to solve the above subject, a liquid sealed mount according to a first feature of the present invention comprises an elastic main body member (30) which is formed as a vibration isolating main body and has a downwardly open liquid chamber concave section (33), a diaphragm (50) for covering the liquid chamber concave section (33), a liquid chamber formed between the liquid chamber concave section (33) and the diaphragm (50), a partition member (40) for partitioning the liquid chamber into a primary liquid chamber (38) and a secondary liquid chamber 52, an orifice passage (48) provided in the partition member (40) so as to provide communication between the primary liquid chamber (38) and the secondary liquid chamber (52, and an outer cylinder (20) in which the elastic main body member (30), the partition member (40) and the diaphragm (50) are accommodated so as to be combined together, wherein an upper part (22) of the outer cylinder (20) functions as a stopper, and the outer cylinder (20) has an upper end portion opening upwardly around the elastic main body member (30) and a lower end portion opening downwardly, and wherein a water drain passage (68) which provides communication between an upper end opening (21) and a lower end opening (23) of the outer cylinder (20) is formed between an outer circumferential portion of a liquid chamber formation unit (18) which is accommodated inside in a lower part (24) of the outer cylinder (20) so as to form the liquid chamber and an inner circumferential surface of the lower part (24) of the outer cylinder (20).

According to a second feature of the present invention, in addition to the first feature, an elastic main body member drain recess (39) and a partition member drain recess (42*a*) are provided in each of outer circumferential portions of the elastic main body member (30) and the partition member (40), a fixing ring (60) is configured to support the diaphragm (50) in contact therewith and to be inserted into an inside of the lower part (24) of the outer cylinder (20), and a fixing ring drain recess (66) is provided in an outer circumferential portion of the fixing ring (60), wherein the water drain passage (68) is formed by providing communication between the elastic main body member drain recess (39), the partition member drain recess (42*a*) and the fixing ring drain recess (66) on the inside of the outer cylinder (20) in the direction of a mount axis.

According to a third feature of the present invention, in addition to the second feature, the fixing ring (60) is press fitted into the outer cylinder (20) and fixed by deforming a part (28) of the lower end portion of the outer cylinder (20).

According to a fourth feature of the present invention, in addition to the first or second feature, the elastic main body member (30) includes a rigid ring (36) which is integrally embedded in a lower end portion (37) surrounding an opening portion of the concave section for forming the liquid chamber, wherein an outer circumference of the ring (36) is covered with an elastic body layer (37*b*), and the elastic main body member drain recess (39) is formed in the elastic body layer (37*b*).

According to a fifth feature of the present invention, in addition to the first or second feature, assembly is performed in a liquid.

Effects of the Invention

According to the first feature of the present invention, the water drain passage (68) which provides communication between the upper end opening (21) and the lower end opening (23) of the outer cylinder (20) is formed between the outer circumferential portion of the liquid chamber formation unit (18) which is accommodated in the lower part (24) of the outer cylinder (20) so as to form the liquid chamber and the inner circumferential surface of the lower part (24) of the outer cylinder (20). With this construction, when accommodating and assembling the liquid chamber formation unit (18) on the inside of the outer cylinder (20), the upper and lower openings communicate with each other, and the water drain passage (68) for draining water off through the inside of the outer cylinder (20) and the outer side of the liquid chamber can be easily formed.

Accordingly, in the case of the long outer cylinder (20) functioning as the stopper a part of which is open upwardly, the water drain passage (68) can be easily provided without forming a water drain opening at the intermediate position in the longitudinal direction of the outer cylinder (20).

Further, the water drain passage (68) can be provided in the outer circumferential portion of the liquid chamber formation unit (18) which has no influence upon the strength of the outer cylinder (20), and the opening for draining the water off is not formed in the lateral surface of the outer cylinder (20), whereby not to incur the deterioration in the strength of the outer cylinder (20).

In addition, since the water drain passage (68) is formed along the inner circumferential surface of the outer cylinder (20) by aligning grooves and recesses in the direction of the mount axis, the opening of the outer cylinder is not closed by the elastic main body member at the time of assembling whereby the workability at the time of assembling can be improved.

According to the second feature of the present invention, the elastic main body member drain recess (39) and the partition member drain recess (42*a*) are provided in each of the outer circumferential portions of the elastic main body member (30) and the partition member (40). The fixing ring (60) is provided for supporting the diaphragm (50), and the fixing ring drain recess (66) is provided also in the fixing ring (60). With this construction, at the time of assembling, the elastic main body member (30), the partition member (40), the diaphragm (50) and the fixing ring (60) are accommodated into the outer cylinder (20) and piled up in a condition where the drain recesses (39, 42*a*, 66) are in alignment with each other, so that the water drain passage (68) is formed between each of these four members (30, 40, 50, 60) and the outer cylinder (20). Therefore, the water drain passage (68) which communicates so as to extend in the direction of the mount axis and drains the water off through the inside of the outer cylinder (20) and the outward side of the liquid chamber can be easily formed.

Moreover, since the water drain passage (68) is formed between the liquid chamber formation unit (18) and the inner circumferential surface of the outer cylinder (20) by piling up each of the component members of the liquid chamber formation unit (18) in the direction of the mount axis, the opening formed in the lateral surface of the outer cylinder is not closed by the elastic main body member at the time of assembling whereby the workability at the time of assembling can be improved.

According to the third feature of the present invention, since the fixing ring (60) is press fitted into the outer cylinder (20), it can be tentatively fastened in place when assembling, and all the components can be firmly combined together by deforming partially and fixing the opening end portion of the outer cylinder (20).

According to the fourth feature of the present invention, in the case where the ring (36) is integrally embedded in the periphery of the opening portion of the elastic main body member (30), the elastic body layer (37*b*) of the lower end portion (37) of the elastic main body member (30) is provided on the outer circumference side of the ring (36), and the elastic main body member drain recess (39) is formed in the elastic body layer (37*b*). Therefore, the ring (36) is not exposed in the elastic main body member drain recess (39), so that the ring (36), even if it is made of metal, can be kept from rusting.

In addition, since the elastic body layer (37b) makes close contact with the inner circumferential surface of the outer cylinder (20), it is possible to seal the elastic main body member drain recess (39).

According to the fifth feature of the present invention, in the case where all the components are assembled in the liquid, even if the liquid is collected between the elastic main body member (30) and the outer cylinder (20), it can be drained off swiftly by means of the water drain passage.

BEST MODE FOR CARRYING OUT THE INVENTION

Figure 1:
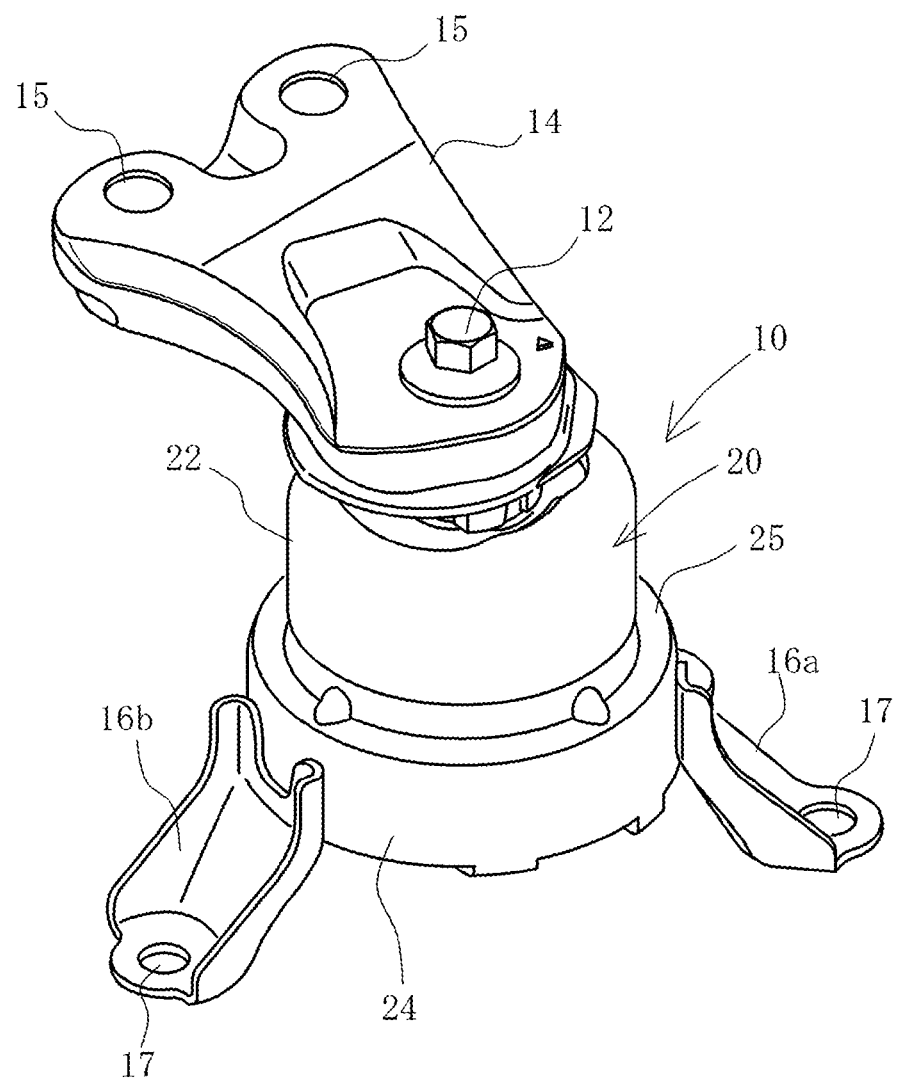
FIG. 1 is a perspective view of a liquid sealed mount in accordance with an embodiment of the present invention.
Figure 2:
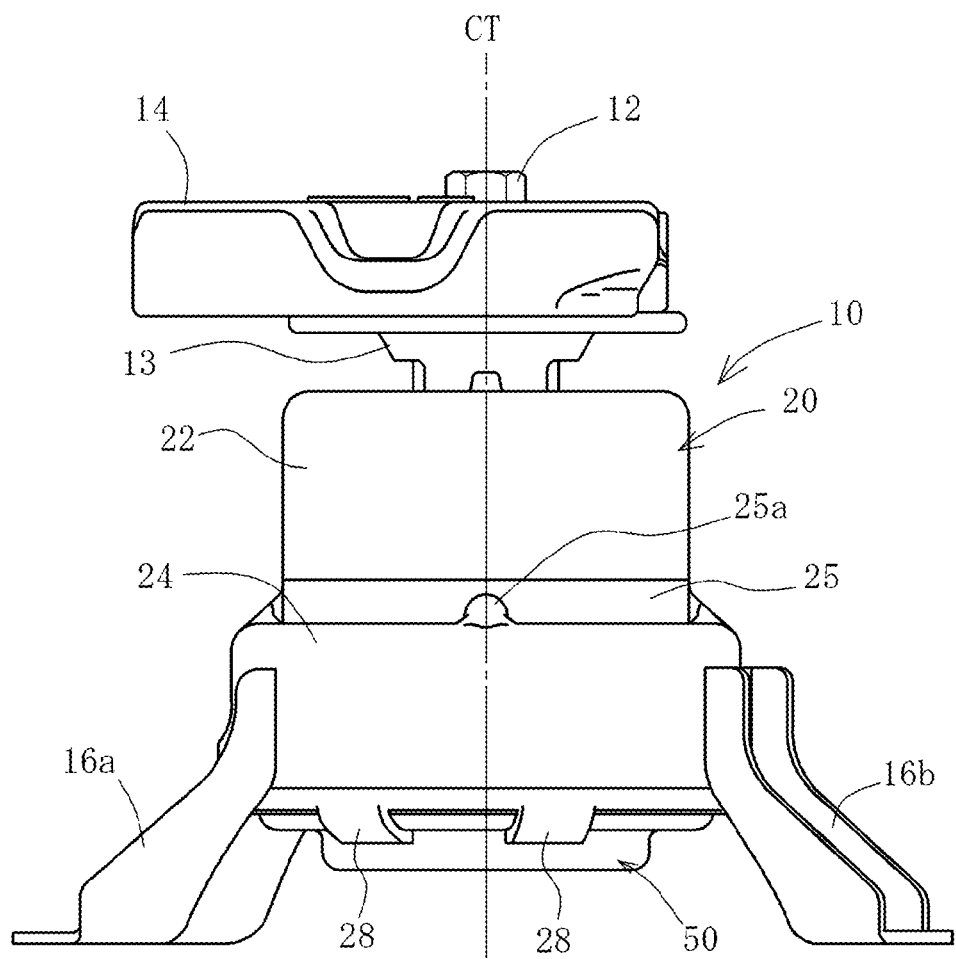
FIG. 2 is a front view of the liquid sealed mount.
Figure 3:
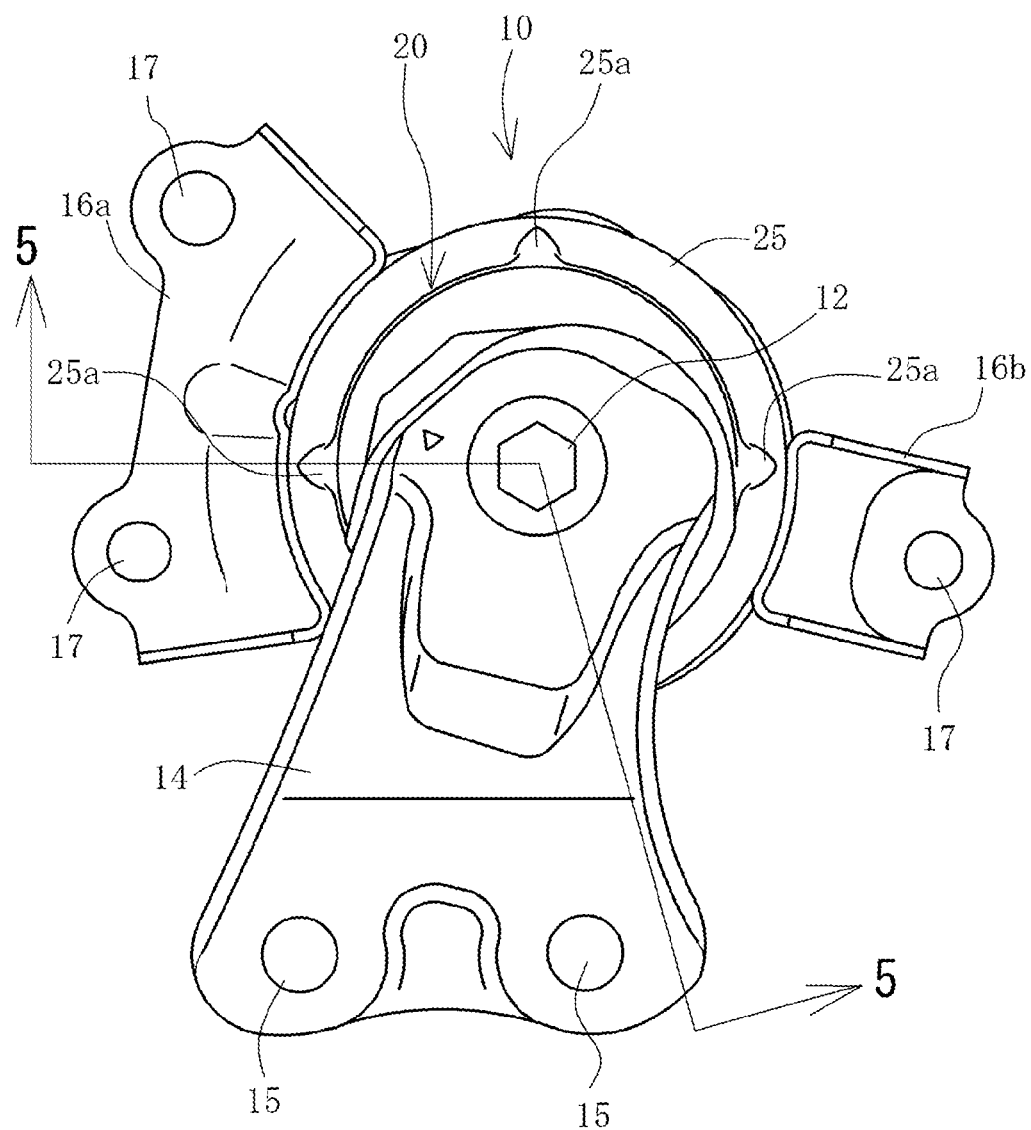
FIG. 3 is a top plan view of the liquid sealed mount.

Referring first to FIGS. 1 through 3, a liquid sealed mount 10 is mounted at an upper part thereof on an engine bracket 14 by a bolt 12 on a mount axis CT. The engine bracket 14 is mounted on an engine by bolts (not shown, respectively) through mounting holes 15 provided in an extension end thereof.

A lower part of the liquid sealed mount 10 is mounted through brackets 16a, 16b of leg shape on a vehicle body which is not shown in the drawing. The mount axis CT is a center axis of the liquid sealed mount 10, and the direction of the mount axis CT is the input direction of a principal vibration to be isolated. The brackets 16a, 16b correspond to second metal mountings to be mounted on the vehicle body and are mounted through mounting holes 17 on the vehicle body by bolts which are not shown in the drawing.

Figure 5:
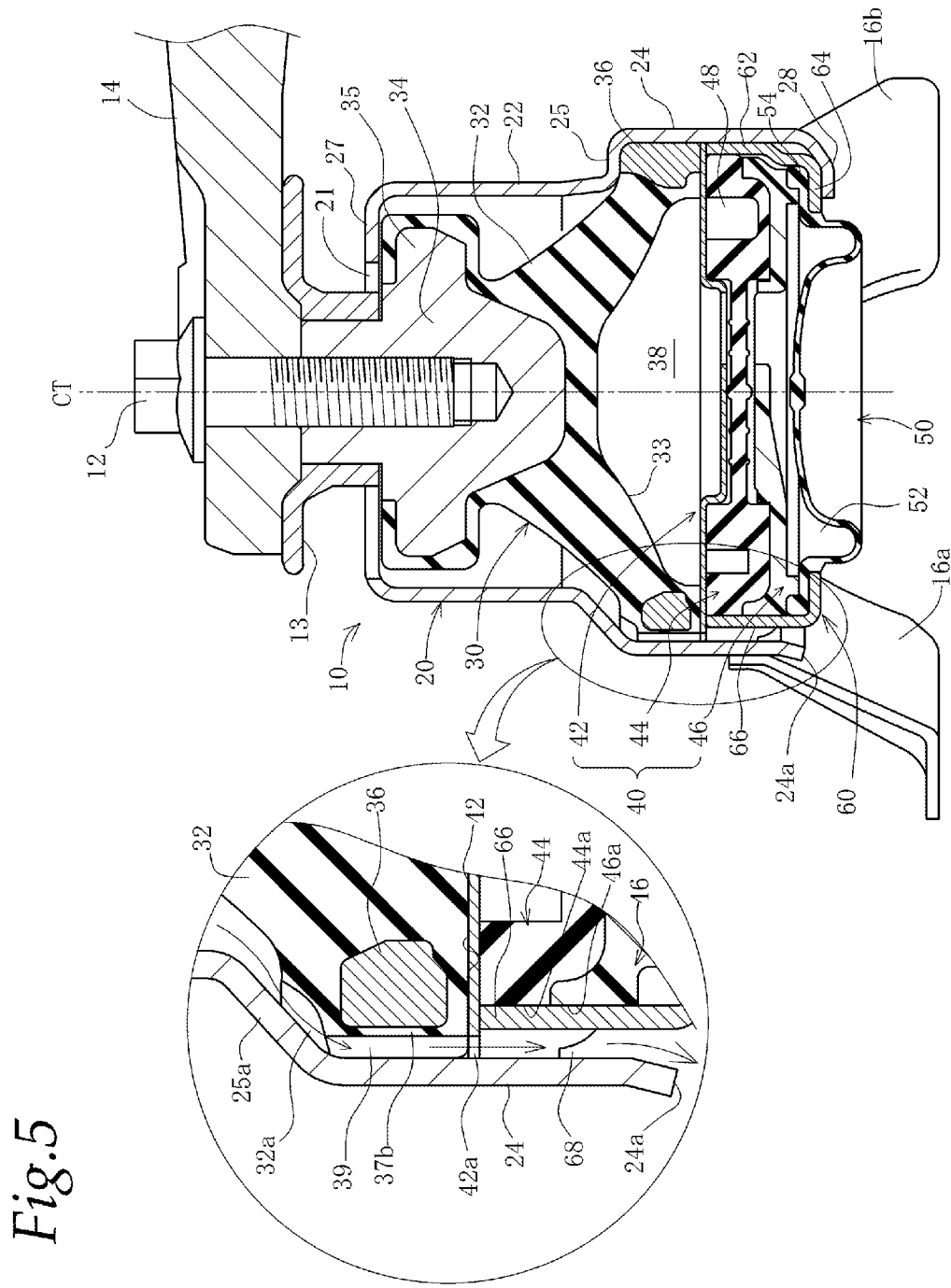
FIG. 5 is a cross sectional view taken on line 5-5 of FIG. 3.

In the present invention, upward and downward directions shall be set on the basis of a condition of FIGS. 2 and 5, and an upper side of the drawing shall be an upper side of the liquid sealed mount 10. Namely, the mount axis CT is arranged to extend in the upward and downward direction, and, on this mount axis CT, the side of a first metal mounting 34 to be referred to later is an upper side.

Figure 6:
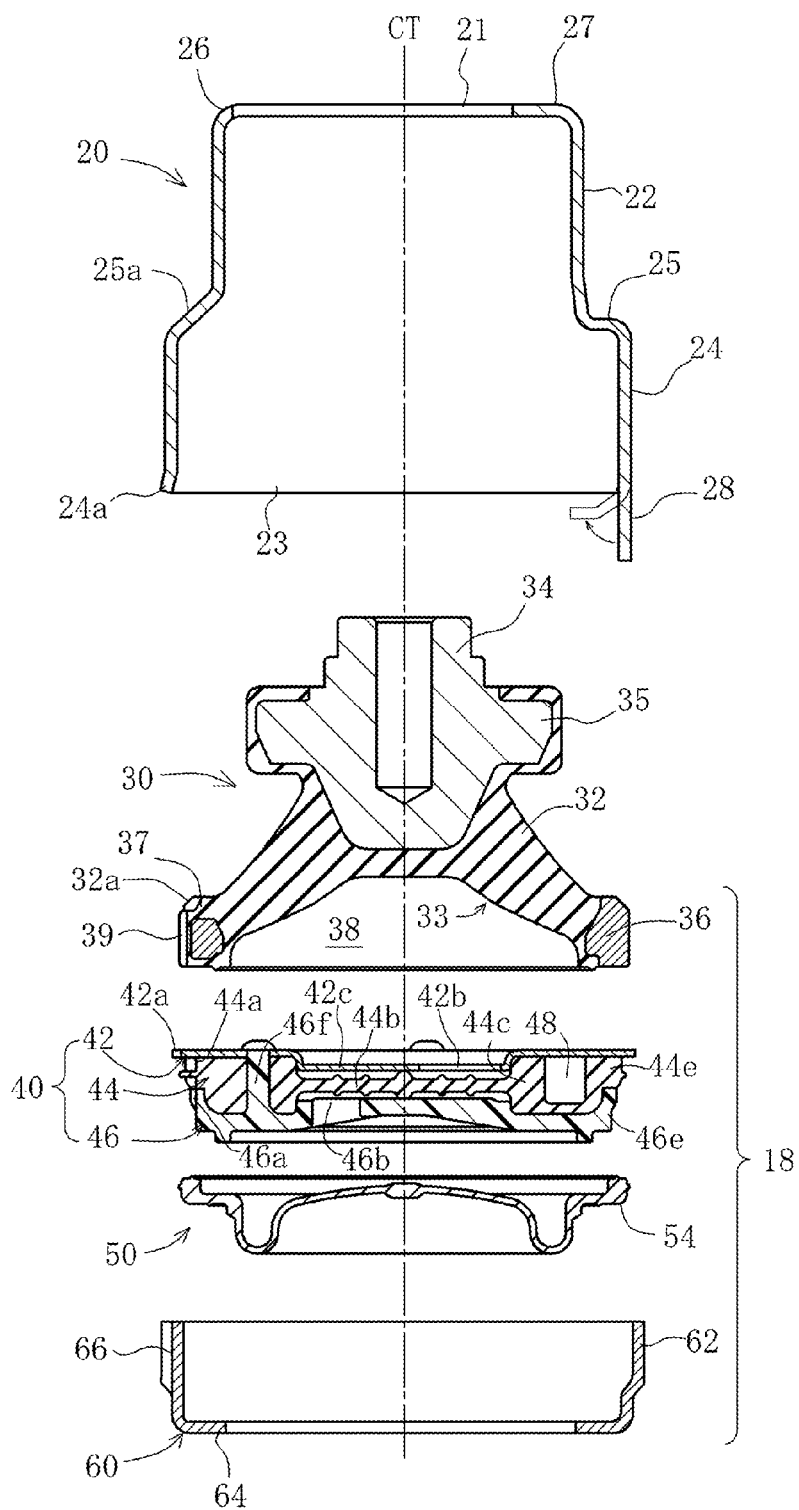
FIG. 6 is an assembly diagram of the whole.

As shown in FIGS. 5 and 6, the liquid sealed mount 10 has a long outer cylinder 20 of a cylindrical shape. An elastic main body member 30, a partition member 40 and a diaphragm 50 are assembled in the outer cylinder 20 and integrally combined together. By the way, with respect to cross sections of each of components (42, 44, 46) forming the partition member 40 in FIG. 6, a lid member 42 is taken along line 6A-6A in FIG. 8, an elastic partition member 44 is taken along line 6B-6B, and a lower holder 46 is taken along line 6C-6C.

The outer cylinder 20 is provided with an upper end opening 21 and a lower end opening 23 at each upper and lower end thereof, and is a metallic cylindrical member which changes in size in two stages in such a way as to be formed of a small diameter portion 22 on the upper side and a large diameter portion 24 on the lower side.

The small diameter portion 22 functions as a stopper, and an upper end portion 26 thereof surrounds the upper end opening 21. A periphery of the upper end portion 26 is bent partially toward a center so as to form a stopper portion 27 of inwardly extending flange shape. The upper end opening 21 is open in the upward and downward direction as an opening portion for allowing the bolt 12 to pass therethrough.

A step portion 25 is formed in a boundary between the small diameter portion 22 and the large diameter portion 24. On the step portion 25 there are formed protruding portions 25a which protrude outwardly at 90° intervals.

The large diameter portion 24 forms a lower part of the outer cylinder 20 into which a liquid chamber formation unit 18 to be referred to later is fitted, and a lower end portion 24a surrounds the lower end opening 23 which is open upwardly and downwardly. An opening edge portion of the lower end portion 24a is bent slightly outwardly in such a way as to be turned up. A claw 28 is formed in a part of the lower end portion 24a and configured to be bent inwardly at the time of assembling.

The brackets 16a, 16b functioning as vehicle body mounting legs are welded to the periphery of the large diameter portion 24.

The elastic main body member 30 includes an elastic body 32 of substantially truncated cone shape made of rubber or the like, the first metal mounting 34 integrally combined with an upper central part of the elastic body 32, and a ring 32 integrally combined with a lower circumferential part of the elastic body 36. The inside of the elastic body 32 is formed with a downwardly open liquid chamber concave section 33 into which a hydraulic liquid is filled so as to form a primary liquid chamber 38.

In the first metal mounting 34 there is formed a screw hole against which the bolt 12 is tightened. Moreover, an upper part of the first metal mounting 34 is formed with a radially extending projecting portion 35. The stopper portion 27 overlaps with the radially extending projecting portion 35 to thereby form a stopper at the time of rebound. In addition, at the time of rebound, a flange member 13 which is engaged on an upper periphery of the first metal mounting 34 projecting from the upper end opening 21 is configured to make contact with the stopper portion 27.

A circumference of an opening portion of the liquid chamber concave section 33 is reinforced with the ring 36. The ring 36 is integrally combined with a lower end portion 37 of the elastic main body member 30. The lower end portion 37 forms a lower end outer circumferential portion of the elastic body 32 which spreads in a chevron shape. The ring 36 is integrally embedded in this lower end outer circumferential portion. An outer circumferential surface of the lower end portion 37 extends substantially in parallel with an inner circumferential surface of the large diameter portion 24. The lower end portion 37 is press fitted into the inner circumferential surface of the large diameter portion 24 and held in sealing engagement therewith. An upper end part of the lower end portion 37 is formed with a shoulder portion which is continuous with an outer circumferential surface of a chevron shaped portion of the elastic body 32. The shoulder portion contacts and is supported by the step portion 25.

The partition member 40 is a member for closing the liquid chamber concave section 33 of the elastic main body member 30 and is integrally provided with a lid member 42, an elastic partition member 44 and a lower holder 46. An orifice passage 48 is provided in the partition member 40. This orifice passage 48 provides communication between the primary liquid chamber 38 and a secondary liquid chamber 52 which is formed between the partition member 40 and a diaphragm 50, and is configured to produce liquid column resonance at a predetermined resonance frequency. A detailed structure of the partition member 40 will be referred to later.

The diaphragm 50 covers the secondary liquid chamber 52 at the lower side of the partition member 40 and is deformable in accordance with volume change of the secondary liquid chamber 52 in such a manner that it follows in the wake of the volume change of the secondary liquid chamber 52 which is formed between the diaphragm 50 and the partition member 40. An outer circumferential portion of the diaphragm 50 forms a thick outer circumference fixing portion 54. This thick outer circumference fixing portion 54 is configured to make contact with a lower surface of the partition member 40 (the lower holder 46).

The thick outer circumference fixing portion 54 of the diaphragm 50 is fixed by a fixing ring 60. The fixing ring 60 is a metal fitting comprised of a cylindrical main body portion 62. A lower end of the fixing ring 60 is formed with a flange portion 64 bent inwardly in an inward flange shape and overlaps as a bottom portion with the thick outer circumference fixing portion 54.

Further, the main body portion 62 is press fitted to and fixed in the inside of the large diameter portion 24 of the outer cylinder 20, and an upper end of the main body portion 62 is in contact with a lower surface of an outer circumferential portion of the lid member 42. In addition, an outer circumferential surface of the main body portion 62 is in close contact with the inner circumferential surface of the large diameter portion 24 with exception of a fixing ring drain recess 66 (see FIG. 6) to be referred to later.

Figure 4:
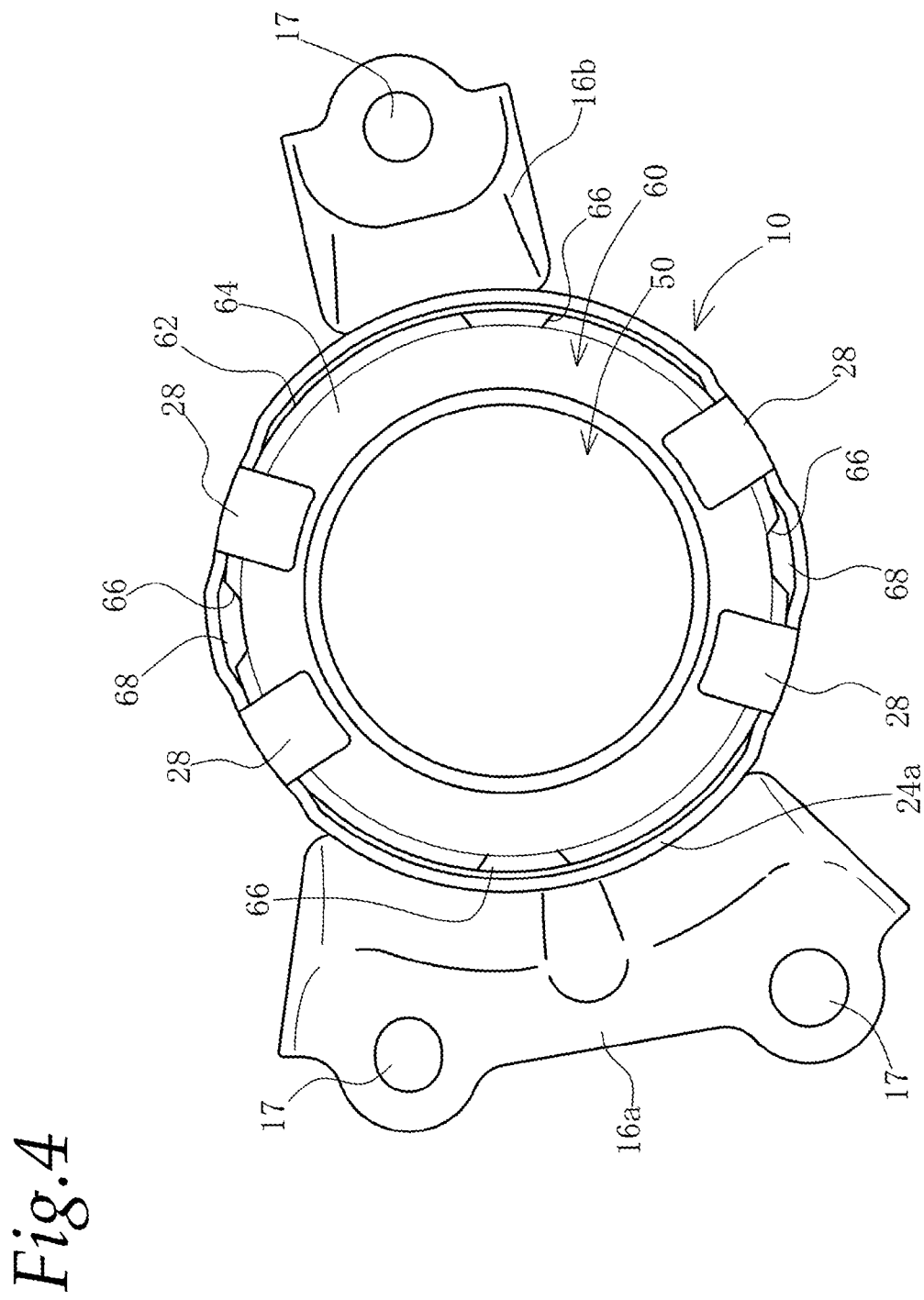
FIG. 4 is a bottom plan view of the liquid sealed mount.

As shown in FIG. 4, the flange portion 64 of the fixing ring 60 is fixed by bending the four claws 28 inwards respectively. The four claws 28 are not provided at regular intervals in the circumferential direction and form groups of two claws to a group. The two claws of the group are arranged adjacent to each other, and the groups are located at about 180° intervals. A lower end portion of a water drain passage 68 is open between the adjacent two claws 28 of the group. The water drain passage 68 is provided between the large diameter portion 24 and the fixing ring drain recess 66 which is formed in the main body portion 62 of the fixing ring 60. The fixing ring drain recesses 66 are located at 90° intervals in the circumferential direction.

A lower end part 24a of the large diameter portion 24 is slightly outwardly expanded and has a small gap between itself and the main body portion 62. However, above the lower end part 24a the outer circumferential surface of the main body portion 62 is in sealing contact with the inner circumferential surface of the large diameter portion 24 by press fitting. In addition, a joint part of the claw 28 located in the lower end part 24a of the large diameter portion 24 extends inwardly and is deformed so as to come partially into contact with the outer circumferential surface of the main body portion 62 by allowing the claw 28 to be bent inwardly.

However, even if the joint part of the claw 28 is deformed like above, since the fixing ring drain recess 66 is formed by allowing a part of the main body portion 62 to be concaved inwardly, there is no possibility that the water drain passage 68 is clogged.

Moreover, although the fixing ring drain recess 66, as shown in the drawing, is not arranged at the center between the pair of neighboring claws 28 but slightly offset to one side of the two claws 28, such offset arrangement has no influence upon the formation of the water drain passage 68, so that the accuracy of positional alignment at the time of assembling can be eased.

Further, since the water drain passage 68 (the fixing ring drain recess 66) is placed between the pair of neighboring claws 28, the interval between the fixing ring drain recess 66 and the inner circumferential surface of the large diameter portion 24 can be fixed and the water drain passage 68 can be maintained in a stable state. In addition, the fixing ring drain recess 66 is arranged also between the spaced apart claws 28. However, since this fixing ring drain recess 66 does not constitute the water drain passage 68, there is no problem even if it is located in such a wide spanned place between such fixed portions.

As shown in FIG. 5, the partition member 40 and the diaphragm 50 are fitted to and engaged on the inside of the fixing ring 60. The flange portion 64 supports the thick outer circumference fixing portion 54 of the diaphragm 50 from below.

The thick outer circumference fixing portion 54 of the diaphragm 50, an outer circumferential portion of the lower holder 46 with which the thick outer circumference fixing portion 54 makes contact and an outer circumferential portion of the elastic partition member 44 which is fitted to and engaged into the outer circumferential portion of the lower holder 46 are fitted to and engaged on the inside of the main body portion 62 which forms an annular wall. The upper end of the main body portion 62 is in contact with the lower surface of the outer circumferential portion of the lid member 42.

Accordingly, when the fixing ring 40 to which the diaphragm 50 and the partition member 40 are fitted in advance is press fitted into the inside of the large diameter portion 24 at the side of the lower end part 24a, the liquid chamber concave section 33 can be covered with these members and integrally combined with the outer cylinder 20.

By the way, a lower part of the elastic main body member 30 accommodated in the outer cylinder 20, the partition member 40, the diaphragm 50 and the fixing ring 60 constitute the liquid chamber formation unit 18 (see FIG. 6).

This liquid chamber formation unit 18 is tentatively fixed to the outer cylinder 20 by press fitting the fixing ring 60 into the large diameter portion 24.

Further, the flange portion 6 formed as the bottom portion of the fixing ring 60 is fixed by bending inwardly the claws 28 which are provided in the lower end part 24a of the large diameter portion 24. Due to the fixation by the claws 28, the elastic main body member 30, the partition member 40, the diaphragm 50 and the fixing ring 60 are assembled in the inside of the outer cylinder 20 and integrally combined in a fluid-tight fashion in a piled up condition between the step portion 25 and the claws 28. The liquid chamber formation unit 18 which is accommodated in and integrally combined with the outer cylinder 20 has such a predetermined high punching load with respect to the outer cylinder 20 as not to get out of the outer cylinder 20 within the range of practical use.

As shown in an enlarged part of FIG. 5, when the fixing ring 60 is fitted to and engaged on the partition member 40 and the diaphragm 50, the fixing ring drain recess 66 overlaps with a partition member second drain recess 44a of the elastic partition member 44 and a partition member third drain recess 46a of the lower holder 46 from outside. In addition, an upper end part of the fixing ring drain recess 66 makes contact with a lower surface of the lid member 42 in such a condition as to surround a partition member first drain recess 42a of the lid member 42.

The partition member first drain recess 42a of the lid member 42 is in alignment with a lower end portion of an elastic main body member drain recess 39 provided in the elastic main body member 30.

Therefore, even if the fixing ring 60 is fitted on the partition member 40 and the diaphragm 50, a gap for the water drain path is formed between the fixing ring drain recess 66 and the inner circumferential surface of the large diameter portion 24. This gap functions as a part of the water drain passage 68 and communicates with the elastic main body member drain recess 39 located above, through the partition member first drain recess 42a of the lid member 42, whereby the water drain passage 68 extending in the direction of the mount axis is able to be formed on the inside of the outer cylinder 20.

Figure 7:
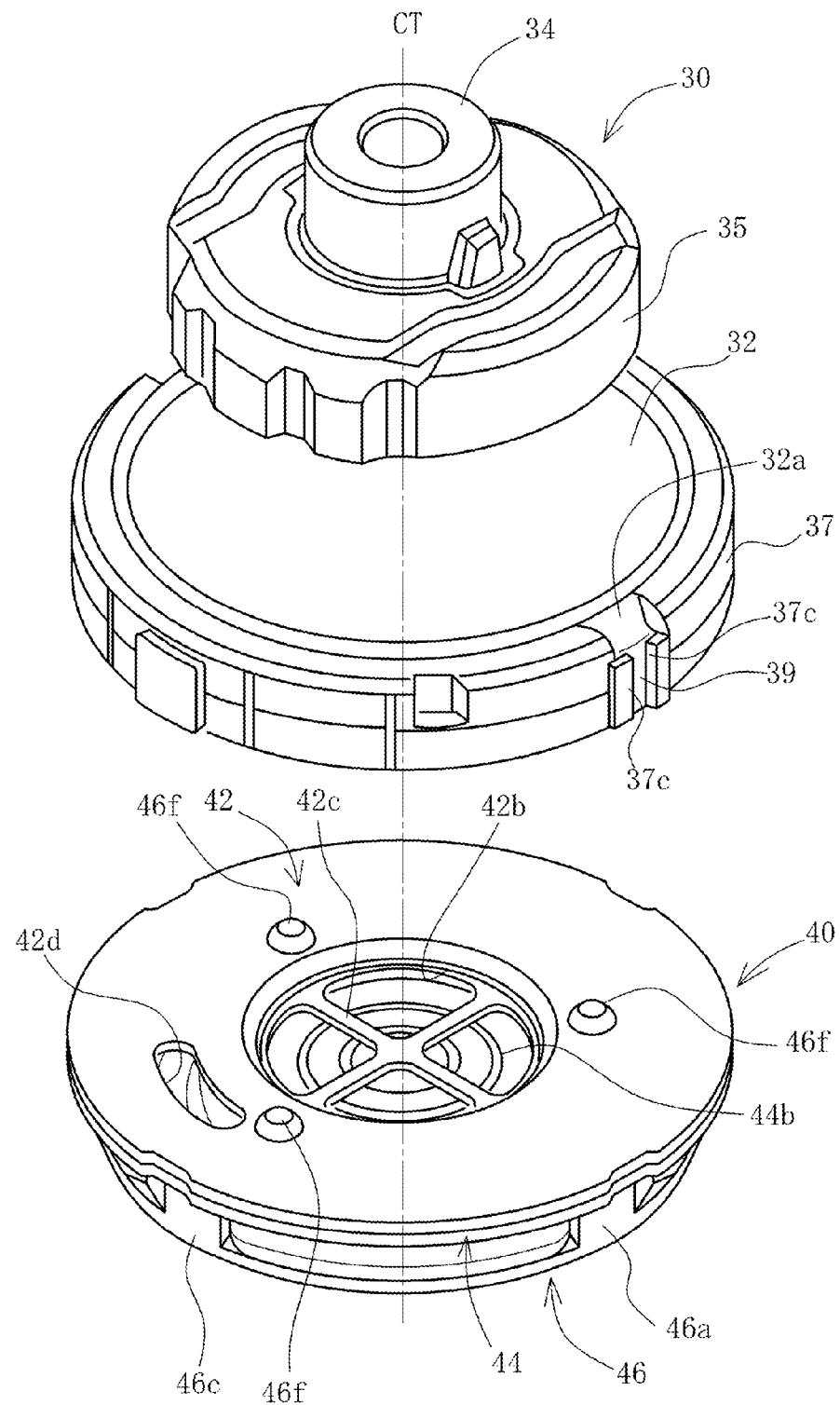
FIG. 7 is an assembly diagram of an elastic main body member and a partition member.

FIG. 7 is an assembly diagram between an elastic main body member and a partition member each of which is shown by a perspective view. The elastic main body member drain recesses 39 of vertical groove shape are arranged at 180° intervals on a circumference of the outer circumferential surface located in the lower end portion 37 of the elastic main body member 30. In addition, a cutout groove 32a which is continuous with an upper portion of the elastic main body member drain recess 39 is formed in the shoulder portion of the lower end portion 37. The cutout groove 32a and the elastic main body member drain recess 39 are aligned with each other while forming a predetermined space under the protruding portion 25a at the time of assembling, so as to constitute a part of the water drain passage 68 (see the enlarged part of FIG. 5).

In a part of the lower end portion 37 in which the elastic main body member drain recess 39 is formed, the ring 36 is covered with an elastic body layer 37b (see the enlarged part of FIG. 5) which is continuous with the elastic body 32, so that the ring 36 is not exposed in the elastic main body member drain recess 39 and the cutout groove 32a. At both sides in the circumferential direction of the elastic main body member drain recess 39 in the outer circumferential surface of the lower end portion 37 there are formed seals 37c of rib shape which extend in parallel with each other in the upward and downward direction. The seals 37c are formed continuously and integrally from the elastic body layer 37b. The seals 37c make sealing contact with the inner circumferential surface of the large diameter portion 24 so as to form a seal of the elastic main body member drain recess 39.

Figure 8:
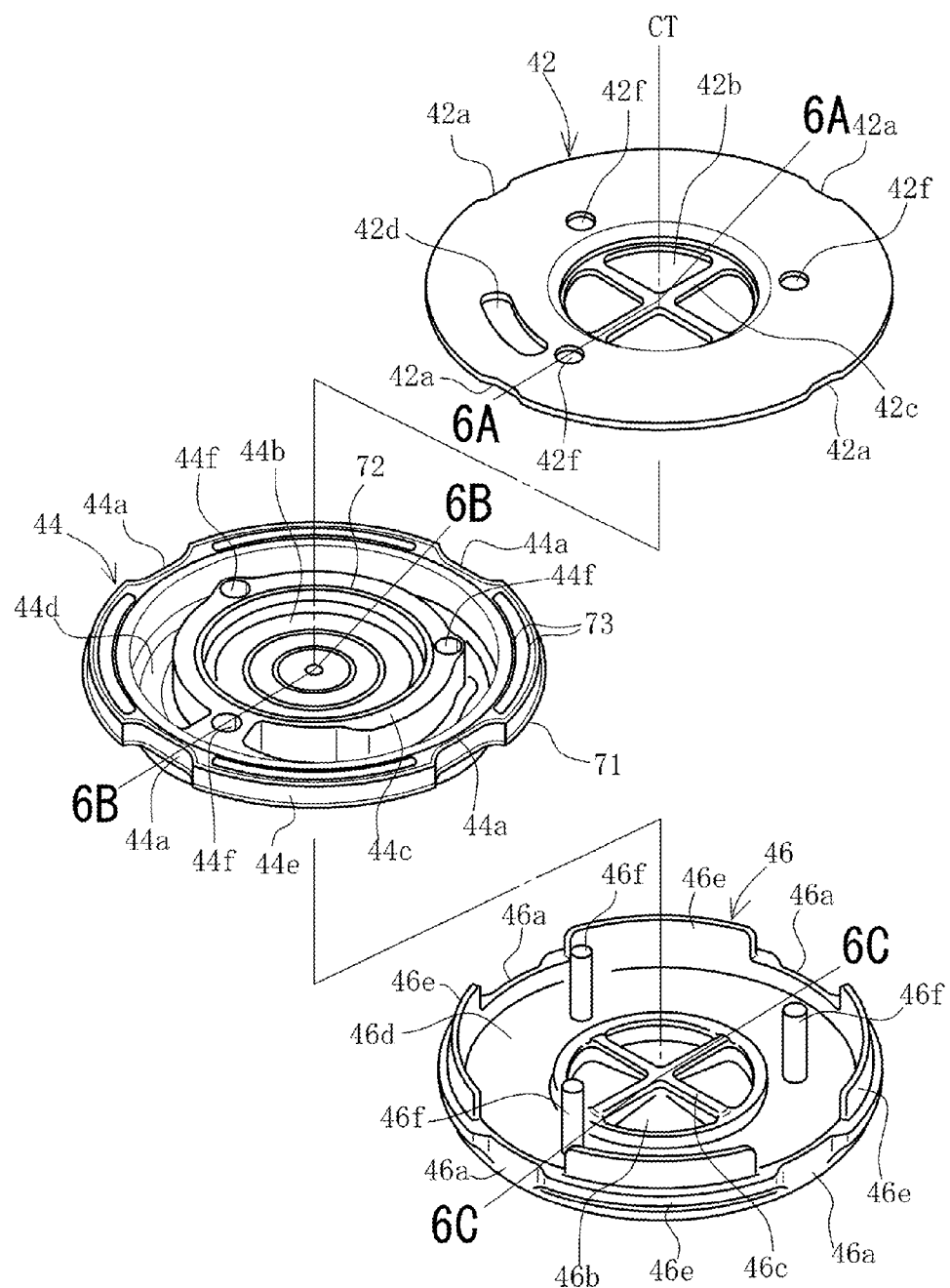
FIG. 8 is an assembly diagram of the partition member.

FIG. 8 is an assembly diagram of the partition member 40, in which the lid member 42, the elastic partition member 44 and the lower holder 46 are shown by perspective views respectively. The partition member drain recess 41 is comprised of the partition member first drain recess 42a, the partition member second drain recess 44a and the partition member third drain recess 46a formed in each of the outer circumferential portions of the component members which form the partition member 40.

Next, the detailed structure of the partition member will be described.

The lid member 42 is made of a rigid member such as metal or the like and formed in the shape of a disc. The outer diameter of the lid member 42 is larger than each of outer diameters of the elastic partition member 44 and the lower holder 46. The partition member first drain recesses 42a are formed at 90° intervals in the circumference of the lid member 42. An opening 42b is provided in a central part of the lid member 42. In the opening 42b there is provided a deformation restraining member 42c of cross shape. A primary liquid chamber side opening 42d of the orifice passage 48 is formed external to the opening 42b.

The elastic partition member 44 is made of an elastic member such as rubber or the like and formed in the shape of an upwardly open cup. In an outer circumferential wall 44e, the partition member second drain recesses 44a are formed at 90° intervals and aligned with the partition member first drain recesses 42a in the circumferential direction. However, the partition member second drain recess 44a is larger than the partition member first drain recess 42a and is formed in a position recessed inwardly in the radial direction.

A central part of the elastic partition member 44 is formed with a movable diaphragm portion 44b facing the opening 42b. In the circumference of the movable diaphragm portion 44b there is formed an inner circumferential wall 44c. An orifice groove 44d which constitutes the orifice passage 48 is formed between the inner circumferential wall 44c and the outer circumferential wall 44e.

The lower holder 46 is a rigid member made of resin or the like and is formed in the shape of an upwardly open cup. An outer circumferential wall 46e is cut out partially at 90° intervals. In these cutout portions there are provided the partition member third drain recesses 46a. The sizes and each of positions in the circumferential direction and in the radial direction of the partition member third drain recesses 46a are configured to correspond to those of the partition member second drain recesses 44a. In a central part of the lower holder 46, an opening 46b is provided and located under the movable diaphragm portion 44b. A deformation restraining member 46c of cross shape is provided in this opening 46b.

A ring shaped bottom portion 46d is formed between the opening 46b and the outer circumferential wall 46e and configured to support the bottom portion of the orifice groove 44d. In addition, in the bottom portion 46d there is formed a secondary liquid chamber side opening (not shown in the drawing) for connecting the orifice passage 48 to the secondary liquid chamber 52.

A reference character 46f designates a positioning projection. When the positioning projections 46f pass through positioning holes 44f formed in the inner circumferential wall 44c, and upper ends of the positioning projections 46f are engaged into positioning holes 42f formed in the lid member 42, three members consisting of the lid member 42, the elastic partition member 44 and the lower holder 46 are fixed in position and integrated into a single structural member.

With the above construction, the partition member first drain recess 42a, the partition member second drain recess 44a and the partition member third drain recess 46a are aligned in the circumferential direction in such a way as to extend continuously in the upward and downward direction to form a single partition member drain recess 41. There are formed four partition member drain recesses 41 at 90° intervals in the circumferential direction. Moreover, in the radial direction, only the partition member first drain recess 42a is located in an outwardly projecting position, while the partition member second drain recess 44a and the partition member third drain recess 46a are aligned with each other in an inwardly offset position.

In an integrally combined condition of the partition member 40, the hydraulic liquid within the primary liquid chamber 38 is able to be moved through the opening 42b to the upper side of the movable diaphragm portion 44b and also the hydraulic liquid within the secondary liquid chamber 52 is able to be moved through the opening 46b to the lower side of the movable diaphragm portion 44b, so that the movable diaphragm portion 44b absorbs the internal pressure fluctuation of the primary liquid chamber 38.

Next, the water drain structure for draining off the water such as rain or the like which enters at the upper end opening 21 inwardly to the inside of the outer cylinder 20 will be described.

As shown in the enlarged part of FIG. 5, in the assembled state, the cutout groove 32a and the elastic main body drain recess 39 are located under and spaced from the protruding portion 25a, so that there is formed the water drain path which communicates in the upward and downward direction between the protruding portion 25a of the step portion 25 and the large diameter portion 24 located directly under the protruding portion 25a.

The lower end of the elastic main body drain recess 39 is in alignment with the partition member first drain recess 42a. The partition member first drain recess 42a communicates with the water drain path formed between the fixing ring drain recess 66 and the large diameter portion 24. Therefore, the water drain path on the side of the elastic main body member 30 communicates with the water drain path on the side of the partition member 40, so that the water drain passage 68 is formed.

However, since the elastic main body member drain recesses 39 are provided at two locations at 180° intervals in the circumferential direction, and the partition member first drain recesses 42a are provided at four locations at 90° intervals in the circumferential direction, two opposed elastic main body member drain recesses 39 are aligned with either one of opposed groups of the four partition member first drain recesses 42a, and other remaining partition member drain recesses 42a are not used for the water drain path. The reason why the drain recesses are different in number like this between the elastic main body member 30 side and the partition member 40 side is to facilitate the positional alignment at the time of assembling. In addition, the protruding portions 25a of the step portion 25 are also different in number from the elastic main body member drain recesses 39.

Accordingly, there is formed the water drain passage 68 consisting of the cutout groove 32a→the elastic main body member drain recess 39→the partition member first drain recess 42a→the fixing ring drain recess→the outside. Therefore, the water which enters from the upper end opening 21 inwardly to the inside of the outer cylinder 20, as shown by arrows in the enlarged part of FIG. 5, passes through the space between the protruding portion 25a and each of the cutout groove 32a and the elastic main body member drain recess 39 and flows through the partition member first drain recess 42a into the fixing ring drain recess 66, whereby to be drained off downwardly from the inside of the large diameter portion 24.

Therefore, since the elastic main body member drain recess 39 and the partition member drain recess 41 are provided each in the outer circumferential portions of the elastic main body member 30 and the partition member 40, the water drain passage 68 can be provided between the inner circumferential surface of the outer cylinder 20 and the liquid chamber formation unit 18, whereby a water drain opening is not required to be provided in the lateral surface of the outer cylinder 20 which has an influence upon the strength of the outer cylinder 20. In particular, in the case where the outer cylinder 20 is extended upwardly to be used simultaneously as the stopper member, this is a suitable structure since there is no portion which is decreased in strength. In addition, since there is no possibility that the opening provided in the lateral surface of the outer cylinder 20 is closed by the liquid chamber formation unit 18 at the time of assembling, the assembling operation can be facilitated.

Further, at the time of assembling, the elastic main body member 30 which constitutes the liquid chamber formation unit 18, the partition member 40, the diaphragm 50 and the fixing ring 60 are accommodated into and piled up in the outer cylinder 20 in a condition where the elastic main body member drain recess 39, the partition member first drain recess 42a and the fixing ring drain recess 66 are in alignment with each other in the upward downward direction. Then, the flange portion 64 of the fixing ring 60 is fixed by the claws 28 which are provided in the lower end part of the large diameter portion 24. Therefore, the water drain passage 68 can be formed simultaneously with assembling. Like this, the water drain passage 68 can be easily formed and the workability can be improved so as to be suitable for the piled up type assembling structure.

Further, since the fixing ring drain recess 66 is provided in the fixing ring 60 for fixing the diaphragm 50, and the water drain passage 68 is formed between the fixing ring drain recess 66 and the outer cylinder 20, the water drain passage 68 can be formed even if the diaphragm 50 is fixed by the fixing ring 60.

Further, since the fixing ring 60 is press fitted into the outer cylinder 20, it can be tentatively fastened in place when assembling, and all the components can be integrally combined together. Moreover, since the flange portion 64 of the fixing ring 60 is fixed by bending the claws 28 of the outer cylinder 20, all the components can be firmly combined together whereby it is possible to obtain the sufficiently large punching load.

Further, since the elastic main body member drain recess 39 which is provided at the lower end portion 37 of the elastic main body member 30 is formed in the elastic body layer 37b which covers the outer circumference of the ring 36, the ring is not exposed in the elastic main body member drain recess 39, so that the ring 36, even if it is made of metal, can be kept from rusting. In addition, the elastic main body member drain recess 39 can be sealed by allowing the elastic body layer 37b to make sealing contact with the inner circumferential surface of the outer cylinder 20. In particular, since the elastic body layer 37b is integrally provided with the seal 37c, higher sealing performance can be obtained.

Moreover, since the protruding portion 25a is formed in the step portion 25, and the cutout groove 32a is provided in a part of the elastic body 32 which is located under the protruding portion 25a, in such a manner that the cutout groove 32a communicates with the elastic main body member drain recess 39, the sufficient space for the water drain path can be formed between the step portion 25 and the elastic body 32 also at the time of assembling. In addition, although the elastic main body member 30 is inserted from the large diameter portion 24 side and the shoulder portion located in the lower end portion 37 makes contact with and is pressed against the step portion 25, the protruding portion 25a swells in such a way as to protrude upwardly from the step portion 25. Therefore, the shoulder portion of the lower end portion 37 does not clog the gap between itself and the protruding portion 25a, so that the water drain path can be ensured at all times.

In addition, since the protruding portion 25a is formed in the step portion 25, the forming and processing can be performed from the large diameter portion 24 side, and so the intermediate portion in the longitudinal direction of the outer cylinder 20 can be protruded outwardly in the radial direction to form the protruding portion 25a.

Further, this liquid sealed mount 10 is assembled in the same liquid as the hydraulic liquid by the piled up method. At that time, a large amount of liquid enters the space between the outer cylinder 20 and the circumference of the elastic main body member 30. However, when, after having assembled the liquid sealed mount 10, the mount axis CT is stood up to extend in the upward downward direction in a condition where the upper end opening 21 is located on the upper side, the large amount of liquid can be drained off swiftly by means of the water drain passage 68. Accordingly, this liquid sealed mount 10 has the structure suitable for assembling in the liquid.

Further, in the case of having been assembled in the liquid by turning upside down, the upper end opening 21 of the outer cylinder 20 turns downward and the lower end opening 23 turns upward. Accordingly, after assembling, a large amount of liquid is collected around the claws 28 and the outer circumferential portion of the fixing ring 60 located in the inside of the lower end opening 23 of the outer cylinder 20. However, since the fixing ring drain recess 66 is formed on the inside of the lower end portion of the large diameter portion 24 and the water drain passage 68 is open at the inside of the large diameter portion 24, the liquid collected inside the large diameter portion 24 is drained off through the water drain passage 68 at the same time as the assembled product is taken out of the liquid.

The present invention is not limited to the above described embodiment, and various modifications and variations may be made within the spirit and scope of the invention. For example, one or more than two water drain passages may be freely selected. In the above description, there are provided, alternately, four protruding portions 25a, two elastic main body member drain recesses 39, four partition member drain recesses 41 and two fixing ring drain recesses 41 in order to facilitate the positional alignment at the time of assembling, and two water drain passages 68 are formed in the end. Each of the drain recesses may be different in number from the number of the above embodiment, and may be the same number.

Further, although the fixing ring 60 is fitted and engaged on each of the outer circumferences of the elastic partition member 44 and the lower holder 46, it may be configured to contact the bottom portion of the lower holder 46. In this case, when the fixing ring drain recess 66 and the partition member drain recess 41 are aligned in the upward and downward direction, the water drain path which constitutes the lower part of the water drain passage 68 can be formed.

Further, a bottom side supporting member made of metal or the like which corresponds to the fixing ring 60 may be integrally formed in the thick outer circumference fixing portion 54 of the diaphragm 50. Since this bottom side supporting member is able to be press fitted into the large diameter portion 24 or to be fixed by the claws 28, it is possible to dispense with the separate fixing ring 60. In this case, a drain recess which corresponds to the fixing ring drain recess 66 is previously formed in the bottom side supporting member.

In addition, the fixing ring 60 may be fixed not only by the claws 28 but also by deforming the lower end portion 24a of the outer cylinder 20 in such a way as to be partially bent or protruded inwardly.

What is claimed is:

1. A liquid sealed mount comprising:

an elastic main body member which is formed as a vibration isolating main body and has a downwardly open liquid chamber concave section, a diaphragm for covering the liquid chamber concave section, a liquid chamber formed between the liquid chamber concave section and the diaphragm, a partition member for partitioning the liquid chamber into a primary liquid chamber and a secondary liquid chamber, an orifice passage provided in the partition member so as to provide communication between the primary liquid chamber and the secondary liquid chamber, and an outer cylinder in which the elastic main body member, the partition member and the diaphragm are accommodated so as to be combined together, wherein an upper part of the outer cylinder functions as a stopper, and the outer cylinder has an upper end portion opening upwardly around the elastic main body member and a lower end portion opening downwardly, and wherein a water drain passage which provides communication between the upper end opening and the lower end opening of the outer cylinder is formed between an outer circumferential portion of a liquid chamber formation unit which is accommodated inside in a lower part of the outer cylinder so as to form the liquid chamber and an inner circumferential surface of the lower part of the outer cylinder, further comprising an elastic main body member drain recess and a partition member drain recess which are provided in each of outer circumferential portions of the elastic main body member and the partition member, a fixing ring being configured to support the diaphragm in contact therewith and to be inserted into an inside of the lower part of the outer cylinder, and a fixing ring drain recess being provided in an outer circumferential portion of the fixing ring, wherein the water drain passage is formed by providing communication between the elastic main body member drain recess, the partition member drain recess and the fixing ring drain recess on the inside of the outer cylinder in the direction of a mount axis.

2. The liquid seal mount according to claim 1, wherein the fixing ring is press fitted into the outer cylinder and fixed by deforming a part of the lower end portion of the outer cylinder.

3. The liquid sealed mount according to claim 1, wherein the elastic main body member includes a rigid ring which is integrally embedded in a lower end portion surrounding an opening portion of the concave section for forming the liquid chamber, and wherein an outer circumference of the ring is covered with an elastic body layer, and the elastic main body member drain recess is formed in the elastic body layer.

4. The liquid sealed mount according to claim 1, wherein assembly is performed in a liquid.

* * * * *